(12) United States Patent
Wu

(10) Patent No.: US 12,317,323 B2
(45) Date of Patent: May 27, 2025

(54) PHYSICAL CHANNEL MONITORING METHOD, TERMINAL DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 400 days.

(21) Appl. No.: 17/935,405

(22) Filed: Sep. 26, 2022

(65) Prior Publication Data

US 2023/0018952 A1 Jan. 19, 2023

Related U.S. Application Data

(63) Continuation of application No. PCT/CN2020/081448, filed on Mar. 26, 2020.

(51) Int. Cl.
*H04B 7/208* (2006.01)
*H04W 24/08* (2009.01)
(Continued)

(52) U.S. Cl.
CPC ....... *H04W 74/0816* (2013.01); *H04W 24/08* (2013.01); *H04W 74/0866* (2013.01)

(58) Field of Classification Search
CPC ............ H04W 74/0816; H04W 24/08; H04W 74/0866; H04L 5/0092
See application file for complete search history.

(56) References Cited

U.S. PATENT DOCUMENTS 10,425,836 B2 * 9/2019 Li .................... H04W 16/28
10,455,488 B1 * 10/2019 Bendlin ............ H04W 16/14
(Continued)

FOREIGN PATENT DOCUMENTS

EP 3606243 2/2020

OTHER PUBLICATIONS

Motorola Mobility et al., "Feature lead summary #2 for NR-U DL Signals and Channels," 3GPP TSG RAN WG1#99, R1-1913416, Nov. 2019.
(Continued)

*Primary Examiner* — Stephen M D Agosta
(74) *Attorney, Agent, or Firm* — Hodgson Russ LLP

(57) ABSTRACT

A physical channel monitoring method, a terminal device, and a non-transitory computer-readable storage medium are provided. The method includes configuring the terminal device with at least one serving cell group; wherein a first serving cell group of the at least one serving cell group corresponds to first information; configuring the terminal device with a periodic channel occupying length on a first serving cell, wherein the periodic channel occupying length comprises a maximum channel occupying length, and the maximum channel occupying length is less than the periodic channel occupying length; and performing, by the terminal device, a PDCCH monitoring process for the first serving cell based on second information, wherein the first serving cell is a serving cell in the first serving cell group, and the second information comprises at least one of the periodic channel occupying length, the maximum channel occupying length, and the first information.

28 Claims, 6 Drawing Sheets

(51) Int. Cl.
*H04W 74/08* (2009.01)
*H04W 74/0816* (2024.01)

(56) References Cited

U.S. PATENT DOCUMENTS

| | | | |
|---|---|---|---|
| 2016/0043841 A1 | 2/2016 | Lunttila et al. | |
| 2017/0238342 A1* | 8/2017 | Yang | H04W 72/543 |
| | | | 370/329 |
| 2018/0220459 A1* | 8/2018 | Park | H04W 48/10 |
| 2018/0338322 A1* | 11/2018 | Sun | H04L 5/0055 |
| 2019/0159256 A1* | 5/2019 | Talarico | H04L 1/187 |
| 2019/0230706 A1* | 7/2019 | Li | H04B 7/0695 |
| 2019/0253200 A1* | 8/2019 | Salem | H04W 74/0808 |
| 2019/0254110 A1* | 8/2019 | He | H04L 41/0896 |
| 2019/0297577 A1* | 9/2019 | Lin | H04W 52/0229 |
| 2019/0306841 A1* | 10/2019 | Huang | H04L 5/0055 |
| 2019/0380064 A1* | 12/2019 | Salem | H04W 74/0808 |
| 2020/0037354 A1* | 1/2020 | Li | H04W 74/0808 |
| 2020/0045696 A1* | 2/2020 | Huang | H04W 72/0446 |
| 2020/0092913 A1 | 3/2020 | Xu et al. | |
| 2020/0245357 A1* | 7/2020 | Cui | H04W 16/14 |
| 2020/0252948 A1* | 8/2020 | Cui | H04W 72/121 |
| 2020/0337077 A1* | 10/2020 | Yoshimura | H04L 1/1864 |
| 2020/0359401 A1* | 11/2020 | Yoshimura | H04L 1/1819 |
| 2020/0367160 A1* | 11/2020 | Braun | H04W 52/0216 |
| 2021/0144757 A1* | 5/2021 | Fazili | H04W 16/14 |
| 2021/0195643 A1* | 6/2021 | Talarico | H04W 74/0816 |
| 2021/0235438 A1* | 7/2021 | Zhou | H04W 72/044 |
| 2021/0258962 A1* | 8/2021 | Kuang | H04L 5/0053 |
| 2021/0298072 A1* | 9/2021 | Oh | H04W 74/085 |
| 2021/0307016 A1* | 9/2021 | Takeda | H04W 72/0446 |
| 2021/0368541 A1* | 11/2021 | Hedayat | H04L 5/005 |
| 2021/0392684 A1* | 12/2021 | Tiirola | H04W 74/0816 |
| 2022/0110152 A1* | 4/2022 | Lim | H04W 74/006 |
| 2023/0180293 A1* | 6/2023 | Calcev | H04W 16/14 |
| | | | 370/328 |
| 2023/0363002 A1* | 11/2023 | Liang | H04W 74/0825 |
| 2023/0389071 A1* | 11/2023 | Li | H04W 72/23 |
| 2024/0023164 A1* | 1/2024 | Jiang | H04W 74/0816 |
| 2024/0365376 A1* | 10/2024 | Wong | H04W 72/12 |

OTHER PUBLICATIONS

Xiaomi, "Discussion on the DL signals and channels for NR-U," 3GPP TSG RAN WG1 #99, R1-1912926, Nov. 2019.
EPO, Extended European Search Report for EP Application No. 20927431.5, Apr. 4, 2023.
Nokia et al., "Remaining issues on DL signals and channels," 3GPP TSG RAN WG1 Meeting #100e, R1-2000501, Feb. 2020.
Motorola Mobility et al., "Agreements from email discussion [100e-NR-unlic-NRU-DL_Signals_and_Channels-03] on search space set monitoring/switching," 3GPP TSG RAN WG1 Meeting #100e, R1-2001389, Feb. 2020.
WIPO, International Search Report and Written Opinion for PCT/CN2020/081448, Dec. 29, 2020.

* cited by examiner

PHYSICAL CHANNEL MONITORING METHOD, TERMINAL DEVICE, AND NON-TRANSITORY COMPUTER-READABLE STORAGE MEDIUM

CROSS REFERENCE TO RELATED APPLICATIONS

The present disclosure is a continuation of International Patent Application No. PCT/CN2020/081448, filed Mar. 26, 2020, the entire disclosure of which is incorporated herein by reference.

TECHNICAL FIELD

The present disclosure relates to a field of communications, and in particular to a physical channel monitoring method, a terminal device, and a non-transitory computer-readable storage medium.

BACKGROUND

Usually, when adopting an unlicensed spectrum, a communication device may follow a principle of "listen before talk (LBT)". That is, before sending a signal on a channel of the unlicensed spectrum, the communication device may first perform a channel listening. Only when a channel listening result is the channel is idle, can the communication device send the signal. When the channel listening result for the channel of the unlicensed spectrum is the channel is busy, the communication device cannot send the signal. In a view of deploying a network, LBT manners may include two types. One is a channel-accessing manner based on a Load based equipment (LBE), which is also referring to as a dynamic channel occupation. The other is a channel-accessing manner based on a Frame based equipment (FBE), which is also referring to as a semi-static channel occupation. During a transmission process, a duration of the communication device sending the signal by the channel of the unlicensed spectrum is not allowed to exceed the maximum channel occupancy time (MCOT).

In a FBE scenario, a channel resource available to the communication device for a service transmission may appear periodically. Specifically, the communication device may perform a sensing for evaluating a channel availability (also known as CCA) for the channel in an idle period. When the sensing for the channel is successful, a Channel Occupancy Time (COT) in a next fixed frame period may be configured to transmit the signal. When the sensing for the channel fails, the COT in the next fixed frame period cannot be configured to transmit the signal.

In a NR based access to Unlicensed spectrum (NR-U) system, a terminal may be configured with two search space (SS) groups on a serving cell. Sometimes, the SS groups may be also referring to as search space sets (SSS) groups, which are configured to monitor a physical downlink control channel (PDCCH).

In a FBE scenario, a problem to be studied in the related art is how to determine switching behaviors of the terminal for the SS groups of the serving cell or a serving cell group.

SUMMARY OF THE DISCLOSURE

A physical channel monitoring method, a terminal device, and a non-transitory computer-readable storage medium are provided in the embodiments of the present disclosure.

A physical channel monitoring method is provided in the embodiments of the present disclosure and includes configuring the terminal device with at least one serving cell group; wherein a first serving cell group of the at least one serving cell group corresponds to first information; configuring the terminal device with a periodic channel occupying length on a first serving cell, wherein the periodic channel occupying length comprises a maximum channel occupying length, and the maximum channel occupying length is less than the periodic channel occupying length; and performing, by the terminal device, a PDCCH monitoring process for the first serving cell based on second information, wherein the first serving cell is a cell in the first serving cell group, and the second information comprises at least one of the periodic channel occupying length, the maximum channel occupying length, and the first information.

A terminal is provided in the embodiments of the present disclosure and includes a processor; and a memory configured to store a computer program; wherein the processor is configured to call and run the computer program stored in the memory, and implement the physical channel monitoring method above.

A non-transitory computer-readable storage medium is provided in the embodiments of the present disclosure and configured for storing a computer program, wherein the computer program causes a computer to implement the physical channel monitoring method above.

DETAILED DESCRIPTION

Figure 1:
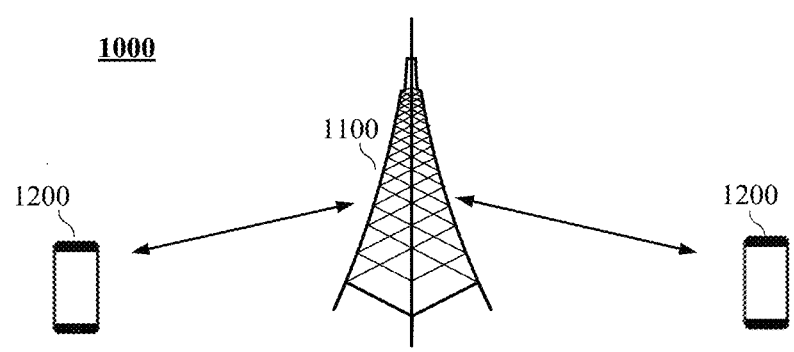
FIG. 1 is a schematic architecture diagram of a communication system according to some embodiments of the present disclosure.

Technical solutions in the embodiments of the present disclosure will be described in the following with reference to accompanying drawings in the embodiments of the present disclosure.

The technical solutions of the embodiments of the present disclosure may be applied to various communication systems, for example, a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system of the NR system, a LTE-based access to unlicensed spectrum (LTE-U), a NR-based access to unlicensed spectrum (NR-U) system, a Non-Terrestrial Networks (NTN) system, a Universal Mobile Telecommunication System (UMTS), a Wireless Local Area Networks (WLAN), a Wireless Fidelity (WiFi), a 5th-Generation (5G) system, or other communication systems, etc.

In general, connections supported by a traditional communication system have a limited number and are easy to achieve. However, with a communication technology developing, a mobile communication system may not only support traditional communications, but also support, for example, a Device to Device (D2D) communication, a Machine to Machine (M2M) communication, a Machine Type Communication (MTC), a Vehicle to Vehicle (V2V) communication, and a Vehicle to everything (V2X), etc. The embodiments of the present disclosure may also be applied to these communication systems.

In some embodiments, a communication system in the embodiments of the present disclosure may be applied to a CA (Carrier Aggregation,) scenario, a DC (Dual Connectivity) scenario, or a SA (Standalone) network-deploying scenario.

In some embodiments, the communication system in the embodiments of the present disclosure may be applied to the unlicensed spectrum which may also be regarded as a shared spectrum. Or, the communication system in the embodiments of the present disclosure may also be applied to a licensed spectrum.

Various embodiments are described in the embodiments of present disclosure in conjunction with a network device and a terminal device. The terminal device may also be referred to as a User Equipment (UE), an access terminal, a user unit, a user station, a mobile station, a mobile platform, a remote station, a remote terminal, a mobile device, a user terminal, a terminal, a wireless communication device, a user agent, or a user device, etc.

The terminal device may be a STAION (ST) in the WLAN, a cellular phone, a cordless phone, a Session Initiation Protocol (SIP) phone, a Wireless Local Loop (WLL) station, a Personal Digital Assistant (PDA) device, a handheld device having wireless communication functions, a computing device, or other processing devices connected to a wireless modem, an in-vehicle device, a wearable device, and a next-generation communication system, for example, the terminal device in a NR network or the terminal device in an evolving-in-future Public Land Mobile Network (PLMN).

In the embodiments of the present disclosure, the terminal device may be deployed on land, including being deployed indoors or outdoors, handheld, wearable, or vehicle-mounted. The terminal device may also be deployed on water (such as being deployed on a ship, etc.). The terminal device may also be deployed in air (such as being deployed on an airplane, a balloon, and a satellite, etc.).

In the embodiments of the present disclosure, the terminal device may be a mobile phone, a Pad, a computer with a wireless transceiver function, a virtual reality (VR) terminal device, and an augmented reality (AR) terminal device, a wireless terminal device in an industrial control, a wireless terminal device in self driving, a wireless terminal device in remote medical, a wireless terminal device in a smart grid, a wireless terminal device in a transportation safety, a wireless terminal device in a smart city, or a wireless terminal device in a smart home, etc.

For an example but not a limitation, in the embodiments of the present disclosure, the terminal device may also be the wearable device. The wearable device may also be referred to as a wearable smart device, which is a general term for the wearable device developed through performing an intelligent design for a daily wear by adopting a wearable technology, such as glasses, gloves, watches, clothing, and shoes. The wearable device is a portable device which is worn directly on a body or integrated into the clothing or accessories of the user. The wearable device is not only a hardware device, but also implement powerful functions through a software support, a data interaction, and a cloud interaction. The wearable smart device in a broad sense may include devices which have complete functions and a large size, and may implement full or a part of the functions without relying on a smart phone, such as smart watches or smart glasses; and devices which may only focus on a certain type of application function and are required to be used cooperating with other devices such as smart phones, for example, all kinds of smart bracelets, smart jewelry, etc. for physical body-sign monitoring.

In the embodiments of the present disclosure, the network device may be a device configured to communicate with the mobile device. The network device may be an AP (Access Point) and the GSM in the WLAN, or a BTS (Base Transceiver Station) in CDMA, or a NodeB (NB) in the WCDMA, or an eNB or eNodeB (Evolutional Node B) in LTE, or a relay station, or AP, or the in-vehicle device, the wearable device, and a gNB in the NR network, or the network device in the evolving-in-future PLMN, and the like.

As an example but not a limitation, in the embodiments of the present disclosure, the network device may have a mobile feature, for example, the network device may be a mobile device. In some embodiments, the network device may be the satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. In some embodiments, the network device may also be a base station arranged in a location such as the land or the water.

In the embodiments of the present disclosure, the network device may provide services for a cell. The terminal device may communicate with the network device through transmission resources (for example, frequency domain resources, i.e., spectrum resources) used by the cell. The cell may be a cell corresponding to the network device (e.g., the base station). The cell may belong to a macro base station, or belong to a base station corresponding to a small cell. The small cell herein may include a Metro cell, a Micro cell, a Pico cell, a Femto cell, etc. These small cells have such characteristics of a small coverage and a low transmit power that the small cells are suitable for providing a high-speed data-transmission service.

FIG. 1 exemplarily shows a network device 1100 and two terminal devices 1200. In some embodiments, a wireless communication system 1000 may include multiple network devices 1100. A covering range of each network device 1100 may include other numbers of terminal devices 120, which will not be limited in the embodiments of the present disclosure. In some embodiments, the wireless communication system 1000 as shown in FIG. 1 may also include other network entities such as a Mobility Management Entity (MME), an Access and Mobility Management Function (AMF), and the like, which will not be limited in the embodiments of the present disclosure.

It should be understood that the term "system" and the term "network" may be often used interchangeably herein.

The term "and/or" herein is configured to describe an association relationship of associated objects. For example, the term "and/or" may indicate three relationships may exist in an object before the term "and/or" and a related object behind the term "and/or". For example, A and/or B, may mean three cases that A exists alone, A and B exist simultaneously, and B exists alone. In addition, a character "I" in herein generally indicates a "or" relationship between an object before the character "I" and a related object behind the character "/".

In order to clearly illustrate ideas of the embodiments of the present disclosure, the channel-accessing manner of FBE in the communication system is briefly described first. The embodiments of the present disclosure include at least part of the following.

In the art, in the channel-accessing manner of FBE, or in the semi-static channel-accessing mode, a frame structure may appear periodically. The frame structure may include a fixed frame period (FFP), a channel occupation time (COT), and an idle period (IP). A length range of the FFP may be, for example, from 1 to 10 ms. A length of COT does not exceed 95% of a length of the FFP. A length of IP is at least 5% of the length of the FFP. The minimum value of IP is 100 us and is located at an end of the FFP.

On the other hand, in the communication system such as the NR-U system, a configuration parameter corresponding to the SS may include a SS group ID (identifier) parameter, such as searchSpaceGroupIdList-r16. When UE is configured with the SS group ID parameter, the SS group ID parameter may indicate the SS may include one of three cases in the following.

① The SS group ID corresponding to the SS is a first group ID, for example, the SS corresponds to or belong to a group 0.

② The SS group ID corresponding to the SS is a second group ID, for example, the SS corresponds to or belong to a group 1.

③ The SS group ID corresponding to the SS corresponds to both the first group ID and the second group ID, for example, the SS corresponds to or belong to both the group 0 and the group 1.

In some embodiments, UE may be configured with a SS switching group indication parameter. When the terminal device is configured with the SS switching group indication parameter, for example, searchSpaceSwitchingGroupList-r16, the SS switching group indication parameter may indicate one or more serving cell groups. For one of the one or more serving cell groups, when UE performs a PDCCH monitoring process, of which switching behaviors for the SS groups of all cells in the one severing cell group are the same. Otherwise, in response to providing with the SS group ID parameter, when performing the PDCCH monitoring process, UE may only perform a SS group switching process for the SS groups on the serving cell.

In some embodiments, UE may be provided with a timer. A timing unit of a value of the timer may be a slot. For example, after the timer is started, each time a slot passes, the value of the timer is subtracted by 1. The value of the timer may be configured by a high layer. For example, the value of the timer may be provided by a high-layer parameter searchSpaceSwitchingTimer-r16.

UE performing the SS group switching process may be implemented in an explicit switching manner, or may be implemented in an implicit switching manner.

Regarding the explicit switching manner, the terminal device may be configured with a switching indicating signaling for indicating the SS group switching process in a downlink control information (DCI) format 2_0. The terminal device may also perform the SS group switching process based on an indication of the switching indicating signaling in a detected DCI format 2_0. Regarding the implicit switching manner, the terminal device may determine whether to switch to, for example, a SSS corresponding to a second group ID based on whether DCI is detected in a SSS corresponding to a first group ID.

Based on FIG. 3-FIG. 6, the explicit switching manner in the serving cell is further described in detail in the following.

For the serving cell, when UE is provided with a position of a SSS switching domain of the severing cell in the DCI format 2_0 by the switching indicating signaling such as a high-layer parameter SearchSpaceSwitchTrigger-r16 and detects the DCI format 2_0 in a slot, the SS group switching process may include at least one of the following cases.

Figure 2:
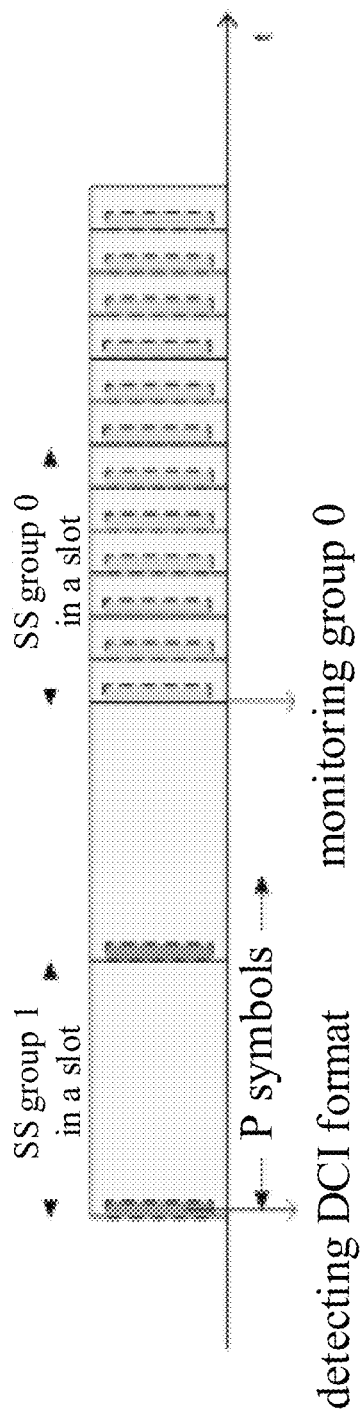
FIG. 2-FIG. 5 are schematic principle-effect diagram of explicitly switching SS groups during a terminal device performing a physical channel monitoring process.

1) The SSS switching domain indicates UE to perform the PDCCH monitoring process based on the SSS corresponding to the first group ID, as shown in FIG. 2. When UE does not perform the PDCCH monitoring process based on the SSS corresponding to the first group ID, UE, from a first slot after at least p symbols to a last symbol of a PDCCH carrying the DCI format 2_0, may perform the PDCCH monitoring process based on the SSS corresponding to the first group ID, and stop a PDCCH monitoring process based on the SSS corresponding to the second group ID.

Figure 3:
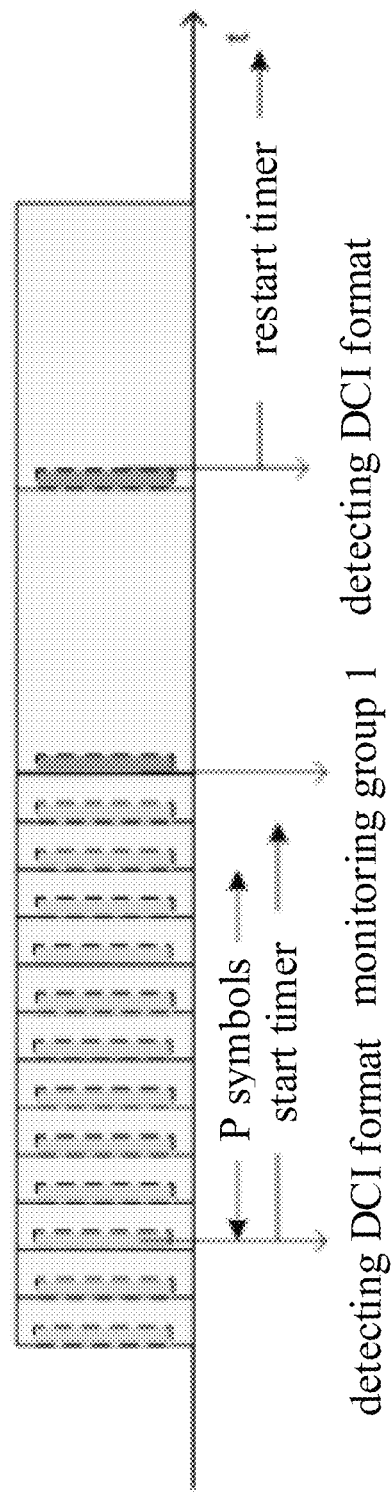

2) The SSS switching domain indicates UE to perform the PDCCH monitoring process based on the SSS corresponding to the second group ID, as shown in FIG. 3. When UE does not perform the PDCCH monitoring process based on the SSS corresponding to the second group ID, UE, from the first slot after at least p symbols to the last symbol of the PDCCH carrying the DCI format 2_0, may perform the PDCCH monitoring process based on the SSS corresponding to the second group ID, and stop the PDCCH monitoring process based on the SSS corresponding to the first group ID.

3) After receiving the DCI format 2_0, UE may set or reset the timer to a value configured by the high-level parameter such as searchSpaceSwitchingTimer-r16.

Figure 4:
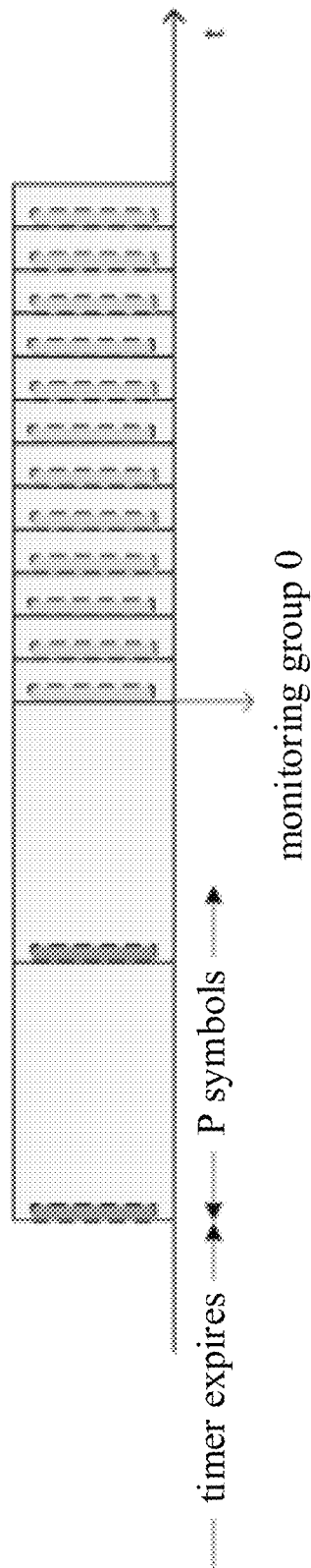
Figure 5:
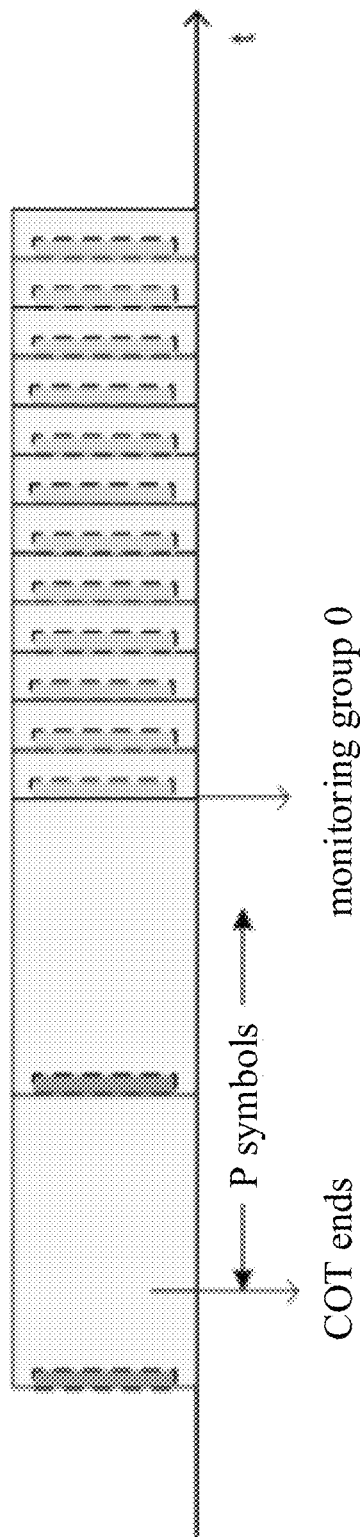

4) As shown in FIG. 4 and FIG. 5, when UE perform the PDCCH monitoring process based on the SSS corresponding to the second group ID, UE, from a first slot after at least p symbols to a slot corresponding to the timer in expiring or a first slot after at least p symbols to a last symbol of a remaining channel occupying length of the serving cell indicated by the DCI format 2_0, may perform the PDCCH monitoring process based on the SSS corresponding to the first group ID, and stop the PDCCH monitoring process based on the SSS corresponding to the second group ID.

In some embodiments, in the above 4), in response to existing the first slot after at least p symbols to the slot corresponding to the timer in expiring, for example, a slot m, and the first slot after at least p symbols to the last symbol of the remaining channel occupying length of the serving cell indicated by the DCI format 2_0, for example, a slot n, slots where UE performs the PDCCH monitoring process based on the SSS corresponding to the first group ID and stops the PDCCH monitoring process based on the SSS corresponding to the second group ID, may include one of the slot m and the slot n, which is earlier.

In some embodiments, UE detecting the DCI format 2_0, may include UE detecting the DCI format 2_0 based on the SSS corresponding to the first group ID, or UE detecting the DCI format 2_0 based on the SSS corresponding to the second group ID, Or UE detecting the DCI format 2_0 based on a SSS corresponding to neither the first group ID nor the second group ID, or UE detecting the DCI format 2_0 based on both the SSS corresponding to the first group ID and the SSS corresponding to the second group ID.

In the FBE scenario, when UE is provided with SS switching indicating signaling by, for example, the high-level parameter, it is required to further clarify and optimize how to determine the switching behaviors of the terminal device for the SS groups of the serving cell and the switching behaviors of the terminal device for the SS groups of the serving cell group.

The embodiments of the present disclosure will provide solutions for both the switching behaviors of the terminal device for the SS groups of the serving cell and the switching behaviors of the terminal device for the SS groups of the serving cell group in the FBE scenario.

Figure 6:
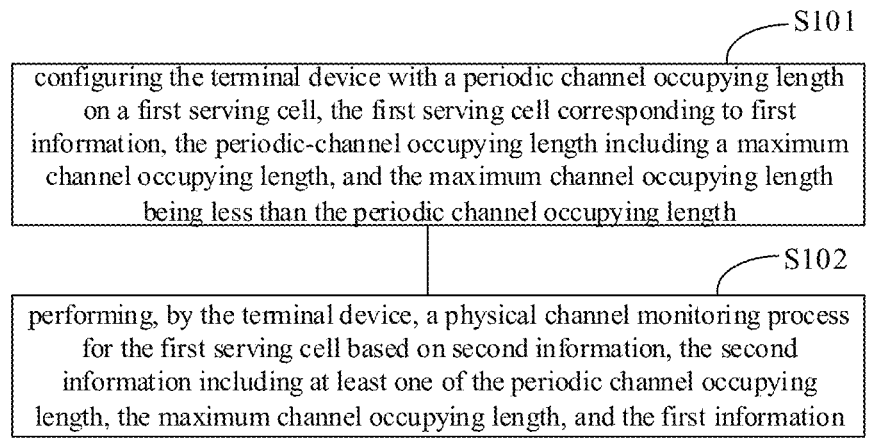
FIG. 6 is a flowchart of a physical channel monitoring method according to an embodiment of the present disclosure.

A physical channel monitoring method may be provided in the embodiments of the present disclosure, as shown in FIG. 6, the method may include operations in the following.

At block S101, configuring the terminal device with a periodic channel occupying length on a first serving cell, the first serving cell corresponding to first information, the periodic-channel occupying length including a maximum channel occupying length, and the maximum channel occupying length being less than the periodic channel occupying length.

At block S102, performing, by the terminal device, a physical channel monitoring process for the first serving cell based on second information, the second information including at least one of the periodic channel occupying length, the maximum channel occupying length, and the first information.

In some embodiments, the physical channel may include a controlling channel. Specifically, the controlling channel may include the PDCCH.

In some embodiments, the physical channel may include a physical channel transmitted between a terminal device and another terminal device, for example, a controlling channel transmitted between a terminal device and another terminal device. Or, the physical channel may include a physical channel transmitted between a network device and another network device, for example, a controlling channel transmitted between a network device and another network device.

It should be understood that, in the embodiments of the present disclosure, the physical channel monitoring process is described by taking the PDCCH monitoring process as an example. When the physical channel to be monitored includes other physical channels, the PDCCH may be replaced by a corresponding physical channel, which will be not repeated herein.

A terminal device in the FBE scenario (or, in other words, the semi-static channel-accessing mode) is considered in the embodiments of the present disclosure. When the terminal device is configured with the periodic channel occupying length on the first serving cell and the first serving cell corresponds to the first information, the terminal device may perform the PDCCH monitoring process for the first serving cell based on the second information. The second information may include the periodic channel occupying length, or also include the maximum channel occupying length in the periodic channel occupying length, or include the first information corresponding to the first serving cell. In this way, the switching behaviors of the terminal device for the SS groups of the first serving cell may be determined.

In the embodiments of the present disclosure, the first information may be the SS switching indicating information. For example, the first information may be the SS switching indicating information of the first serving cell. Or in other words, the first information may be SS switching indicating information configured by the network device for the first serving cell. In some embodiments, the periodic channel occupying length is the length of the FFP. In some embodiments, the maximum channel occupying length is a length of the maximum COT corresponding to the FFP.

Figure 7:
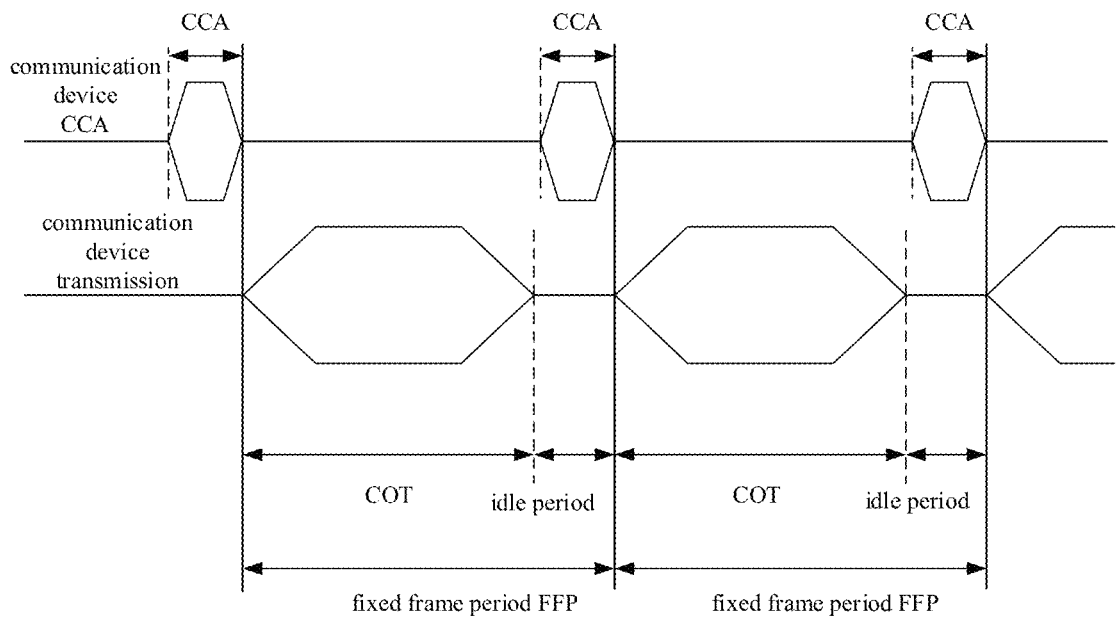
FIG. 7 is a schematic principle-effect diagram of a semi-static channel-accessing mode.

Before various implementations of the embodiments of the present disclosure are described in detail, a channel-accessing mode (or the semi-static channel-accessing mode) of a device FBE based on a frame structure in the NR-U system is briefly described first. The semi-static channel-accessing mode may be indicated by the network device through a system information block (SIB)1 or configured through the high-layer parameter. As shown in FIG. 7, the length $T_x$ of FFP may be configured by the network device, the unit of $T_x$ is ms. The value range of $T_x$ may include, for example: 1, 2, 2.5, 4, 5, and 10. In some embodiments, from each two consecutive radio frames, in the each two consecutive radio frames, a starting position of FFP may be determined based on $x \cdot T_x$, $$x \in \left\{ 0, 1, \ldots, \frac{20}{T_x} - 1 \right\}.$$

The length of a maximum COT in FFP may be $T_y=0.95T_x$. A length of IP in FFP may at least be $T_x=\max(0.05T_x, 100$ us).

In some embodiments, when the serving cell is configured with a semi-static channel-accessing mode, the periodic channel occupying length of the serving cell may be $T_x$. The maximum channel occupying length in the periodic channel occupying length of the serving cell may be $T_y$. The length of IP in the periodic channel occupying length of the serving cell may be $T_g$. In some embodiments, the terminal device may determine $T_y$ and/or $T_z$ according to $T_x$ which the terminal device is configured with. For example, as described above, after determining the length $T_x$ of FFP, the terminal device may determine information such as the starting position of FFP, a period of the FFP, the length of the maximum COT configured for signal transmitting in FFP, and IP configured for channel sensing in FFP based on a preset rule.

It should be understood that, in the embodiments of the present disclosure, the serving cell may also be referred to as the cell. The SS may also be referred to as the SSS. The SS group may also be referred to as a SSS group.

In some embodiments of the present disclosure, the terminal device performing the PDCCH monitoring process for the first serving cell may include the terminal device performing the PDCCH monitoring process on a downlink activated Bandwidth part (BWP) of the first serving cell.

In some embodiments of the present disclosure, for the first serving cell, the SSS configured to the terminal device including the SS group ID may include, on a BWP of the first serving cell, the SSS configured to the terminal device including the SS group ID. In some embodiments, each of the SSSs on different BWPs of the same serving cell is independently configured.

In the embodiments of the present disclosure, when the terminal device is provided with the SS switching group indication parameter such as searchSpaceSwitchingGroupList-r16 which may indicate one or more serving cell groups, the terminal device may be considered to perform the PDCCH monitoring process based on the serving cell groups. For the first serving cell group in the one or more serving cell groups, the switching behaviors of the terminal device for the SS groups of all the cells in the first serving cell group may be the same. In some embodiments, the first serving cell group may include any one of the one or more serving cell groups. On the contrary, when the terminal device is not provided with the SS switching group indication parameter, or when the first serving cell of the terminal device does not belong to any serving cell group, the terminal device may be considered to perform the PDCCH monitoring process based on the serving cell.

In some embodiments, a serving cell may be configured to belong to at most one serving cell group. For example, a cell cannot belong to two or more serving cell groups at the same time. For another example, a cell may be configured to belong to one serving cell group, or not to belong to any serving cell group.

According to the embodiments of the present disclosure, in the FBE scenario, a first cell which does not belong to any serving cell group may be considered first. In a case where the first cell is provided with the SS switching indicating signaling (e.g., the high-layer parameter SearchSpaceSwitchTrigger-r16), the terminal may perform the PDCCH monitoring process based on an indication of the SS switching indicating signaling. The SS switching indicating signaling is the switching indicating signaling corresponding to the first cell. When performing the PDCCH monitoring process on the first serving cell, the terminal device may switch the SS group according to at least one of various embodiments in the following.

Manner One

In the embodiments of the present disclosure, the terminal device may receive, for example, detect a first DCI format, and the first information (e.g., the switching indicating signaling of the first cell) in the first DCI format indicates the first group ID. Or a value of the SSS switching domain of the first serving cell provided by the switching indicating signaling is 0, which may mean the first information indicates the first group ID. In some embodiments, the first DCI format may include DCI format 2_0.

In a case where the first information indicates the first group ID, when the terminal device does not perform the PDCCH monitoring process based on the SSS corresponding to the first group ID, the terminal device may perform the PDCCH monitoring process based on the SSS corresponding to the first group ID from a slot 1 of the first serving cell, and stop PDCCH monitoring processes based on SSSs corresponding to other group IDs.

In some embodiments, other group IDs in this case may include the second group ID.

In some embodiments, the slot 1 may include a first slot after at least p symbols to a last symbol of a PDCCH carrying the first DCI format.

Manner Two

In the embodiments of the present disclosure, the terminal device may detect the first DCI format, and the first information, for example, the switching indicating signaling of the first cell, in the first DCI format indicates the second group ID. Or the value of the SSS switching domain of the first serving cell provided by the switching indicating signaling is 1, which may indicate the first information indicates the second group ID.

In a case where the first information indicates the second group ID, when the terminal device does not perform the PDCCH monitoring process based on the SSS corresponding to the second group ID, the terminal device may perform the PDCCH monitoring process based on the SSS corresponding to the second group ID from a slot 2 of the first serving cell, and stop PDCCH monitoring processes based on SSSs corresponding to other group IDs.

In some embodiments, other group IDs in this case may include the first group ID.

In some embodiments, the slot 2 may include the first slot after at least p symbols to the last symbol of the PDCCH carrying the first DCI format.

Manner Three

In the embodiments of the present disclosure, in the case where the first information indicates the second group ID, the terminal may set a first timer to a first timing value.

In some embodiments, in response to receiving the first DCI format and the first information in the first DCI format indicating the second group ID, the terminal may set the first timer to the first timing value at a slot where the terminal device detects the first DCI format.

In some embodiments, the first timing value of the first timer may be configured by the high layer. For example, the first timing value may be provided by the high-layer parameter searchSpaceSwitchingTimer-r16. The first timing value may be configured to include N numbers of time units such as slots, and N is a positive integer. In some embodiments, the first timer may take a time unit such as the slot, or a symbol, or a sub-frame, or a sub-slot (for example, one sub-slot may include a certain integer numbers of symbols, and the certain integer being less than 14) as the timing unit. For example, the timing unit of a value of the first timer is the slot. After the first timer is set with a value, the value of the first timer may be subtracted by 1 each time a slot passes.

In some embodiments, each serving cell may be configured with a first timer, or each terminal device may be configured with a first timer. For example, the first timer may be a timer corresponding to the first serving cell.

In some embodiments, in response to the terminal device performing the PDCCH monitoring process based on the SSS corresponding to the second group ID, the terminal device may perform the PDCCH monitoring process based on the SSS corresponding to the first group ID from a slot 3 of the first serving cell, and stop the PDCCH monitoring process based on the SSS corresponding to the second group ID.

In some embodiments, the slot 3 may include a first slot after at least p symbols to a slot corresponding to the first timer in expiring.

In the manners 1-3 above, the slot 1, the slot 2, the slot 3, and the P symbols may be determined based on a first subcarrier space. In some embodiments, the first subcarrier space may be a subcarrier space corresponding to the first serving cell, or the first subcarrier space may be preset, or the first subcarrier space is determined based on a subcarrier space configuration configured by the network device.

In some embodiments of the present disclosure, a value of the first subcarrier space and a value of P in the P symbols may satisfy at least one of the following relationships.

a) The P is greater than or equal to 10, in response to the first subcarrier space being 15 kHz or a configuration of the first subcarrier space being $\mu=0$.

b) The P is greater than or equal to 12, in response to the first subcarrier space being 30 kHz or the configuration of the first subcarrier space being µ=1.

c) The P is greater than or equal to 22, in response to the first subcarrier space being 60 kHz or the configuration of the first subcarrier space being µ=2.

d) The P is greater than or equal to 25, in response to the first subcarrier space being 120 kHz or the configuration of the first subcarrier space being µ=3.

In some embodiments, at least one of the above cases corresponds to a UE capability 1.

In some embodiments of the present disclosure, the value of the first subcarrier space and the value of P in the P symbols may satisfy at least one of the following relationships.

a) The P is greater than or equal to 5, in response to the first subcarrier space being 15 kHz or a configuration of the first subcarrier space being µ=0.

b) The P is greater than or equal to 5.5, in response to the first subcarrier space being 30 kHz or the configuration of the first subcarrier space being µ=1.

c) The P is greater than or equal to 11, in response to the first subcarrier space being 60 kHz or the configuration of the first subcarrier space being µ=2.

In some embodiments, at least one of the above cases corresponds to a UE capability 2.

In some embodiments, the manners 1-3 above may be applied in COT in FFP, or the maximum COT in FFP.

The manners 1-3 above respectively describe the SS group switching process performed by the terminal device in a case where the first information indicates different group IDs and in response to the terminal performing the PDCCH monitoring process for the first serving cell based on the first information. In addition, the terminal may perform the PDCCH monitoring process for the first serving cell and switch the SS groups based on the periodic channel occupying length or the maximum channel occupying length, which will be described in detail respectively in the following.

Manner Four

In the embodiments of the present disclosure, the terminal device may perform the PDCCH monitoring process based on a SSS corresponding to a default group ID from an initiate symbol in a first periodic channel occupying length. Or the terminal device may perform the PDCCH monitoring process based on the SSS corresponding to the default group ID from an initiate symbol of a first FFP.

In some embodiments, the default group ID may be the first group ID (e.g., a group 0) or the second group ID (e.g., a group 1). The default group ID may be preset, or configured by the network device, or may be agreed.

In the embodiments of the present disclosure, the first periodic channel occupying length may correspond to FFP in any frame structure, such that the terminal device may always perform the PDCCH monitoring process based on a SSS corresponding to a default SS group (e.g., the group 0) from an initiate position of each FFP. For example, when performing the PDCCH monitoring process based on a SSS corresponding to the group 1 in a FFP, the terminal device may be required to switch to a SSS corresponding to a default group 0, based on which a PDCCH monitoring process is performed.

Manner Five

In the embodiments of the present disclosure, the terminal device may perform the PDCCH monitoring process for the first serving cell in a channel occupation of a first periodic channel occupying length. Or, in other words, the terminal device may perform the PDCCH monitoring process for the first serving cell in COT in the first FFP.

In the embodiments of the present disclosure, the terminal device may not perform the PDCCH monitoring process from a last symbol of the channel occupation of the first periodic channel occupying length, i.e., from an end position of the last symbol, to an initiate symbol in a second periodic channel occupying length. The first periodic channel occupying length and the second periodic channel occupying length are two consecutive periodic channel occupying lengths, and the first periodic channel occupying length is ahead of the second periodic channel occupying length in a time domain. Or, in other words, the terminal device may not perform the PDCCH monitoring process from a last symbol of a channel occupation of the first FFP, i.e., from an end position of the last symbol, to an initiate symbol in a second FFP. The first FFP and the second FFP are two consecutive periodic channel occupying lengths, and the first FFP is ahead of the second FFP in the time domain.

In some embodiments, the channel occupation of the first periodic channel occupying length may be determined based on the maximum channel occupying length.

In some embodiments, the channel occupation of the first periodic channel occupying length may be determined based on the remaining channel occupying length indicated in the first DCI format.

In some embodiments, in response to receiving the first DCI format and the first DCI format indicating the remaining channel occupying length, the channel occupation of the first periodic channel occupying length may be determined based on the remaining channel occupying length indicated in the first DCI format. In response to not receiving the first DCI format or the first DCI format not indicating the remaining channel occupying length, the channel occupation of the first periodic channel occupying length may be determined based on the maximum channel occupying length.

In some embodiments, in response to the first DCI format including slot format indicating (SFI) information or indication information of a COT length, the first DCI format may indicate the remaining channel occupying length. When the first DCI format does not include the SFI information or the indication information of the COT length, the first DCI format does not indicate the remaining channel occupying length.

In some embodiments of the present disclosure, in response to the first serving cell including a first SSS which may include at least one SSS, and the first SSS not belonging to neither the SSS corresponding to the first group ID nor the SSS corresponding to the second group ID, the terminal device may perform the PDCCH monitoring process base on the first SSS. Or, the terminal device may perform the PDCCH monitoring process base on the first SSS in the channel occupation of the first periodic channel occupying length.

In some embodiments of the present disclosure, in response to the first serving cell including a second SSS which may include at least one SSS, and the first SSS belonging to both the SSS corresponding to the first group ID and the SSS corresponding to the second group ID, the terminal device may perform the PDCCH monitoring process base on the second SSS. Or, the terminal device may perform the PDCCH monitoring process base on the second SSS in the channel occupation of the first periodic channel occupying length.

In some embodiments, in response to the first serving cell including the SSS corresponding to the first group ID but not including the SSS corresponding to the second group ID, the terminal device may perform the PDCCH monitoring process base on the SSS corresponding to the first group ID. Or, the terminal device may perform the PDCCH monitoring process base on the SSS corresponding to the first group ID in the channel occupation of the first periodic channel occupying length.

For example, when the first cell is configured with the semi-static channel-accessing mode and does belong to any serving cell, in a case where the first cell is provided with switching indicating signaling such as the high-layer parameter SearchSpaceSwitchTrigger-r16, UE may perform the PDCCH monitoring process base on the indication of the switching indicating signaling. The switching indicating signaling may correspond to the first cell. When UE performs the PDCCH monitoring process for the first cell, behaviors of UE may include at least one of the following.

1) For at least one SS of the first cell which does not belong to a SS group 0 or a SS group 1, UE may need to perform the PDCCH monitoring process base on the at least one SSS in COT of a current FFP.

2) From the initial position of FFP, UE may perform the PDCCH monitoring process base on a SSS in the default SS group, for example, the SS group 0.

3) When UE receives the value of the SSS switching domain of the serving cell provided by the switching indicating signaling is 0, in response to UE not performing the PDCCH monitoring process base on a SSS in the SS group 0, from a first slot after at least p symbols to a last symbol of a PDCCH carrying the DCI format 2_0, UE may perform the PDCCH monitoring process base on the SSS in the SS group 0 and stop performing PDCCH monitoring process base on a SSS in the SS group 1.

4) When UE receives the value of the SSS switching domain of the serving cell provided by the switching indicating signaling is 1, in response to UE not performing the PDCCH monitoring process base on the SSS in the SS group 1, from the first slot after the at least p symbols to the last symbol of the PDCCH carrying the DCI format 2_0, UE may perform the PDCCH monitoring process base on the SSS in the SS group 1 and stop performing the PDCCH monitoring process base on the SSS in the SS group 0.

5) When UE receives the value of the SSS switching domain of the serving cell provided by the switching indicating signaling is 1, after UE receives the DCI format 2_0, UE may set or reset the first timer to the first timing value. The first timing value may be a value configured by the high-layer parameter such as searchSpaceSwitchingTimer-r16.

6) When UE performs the PDCCH monitoring process base on the SSS in the SS group 1, from the first slot after the at least p symbols to the slot corresponding to the first timer in expiring, UE may perform the PDCCH monitoring process base on the SSS in the SS group 0 and stop performing the PDCCH monitoring process base on the SSS in the SS group 1.

7) From a last symbol of a channel occupation of the current FFP to an initiate symbol of a next FFP, UE may stop performing the PDCCH monitoring process. The last symbol of the channel occupation of the current FFP may be determined based on the remaining channel occupying length indicated in the DCI format 2_0 and/or the maximum COT in FFP. For example, when the DCI format 2_0 includes an indication of the remaining channel occupying length, the last symbol of the channel occupation of the current FFP may include a last symbol of the remaining channel occupying length. Or, when the DCI format 2_0 does not include the indication of the remaining channel occupying length, the last symbol of the channel occupation of the current FFP may include a last symbol corresponding to the maximum COT in the current FFP.

The switching behaviors of the terminal device for the SS groups of the serving cell in the FBE scenario may be determined according to at least one embodiments of the present disclosure described above. A switching process performed by the terminal device for the SS groups in each serving cell of at least one serving cell group may be described in Multiple embodiments below.

Figure 8:
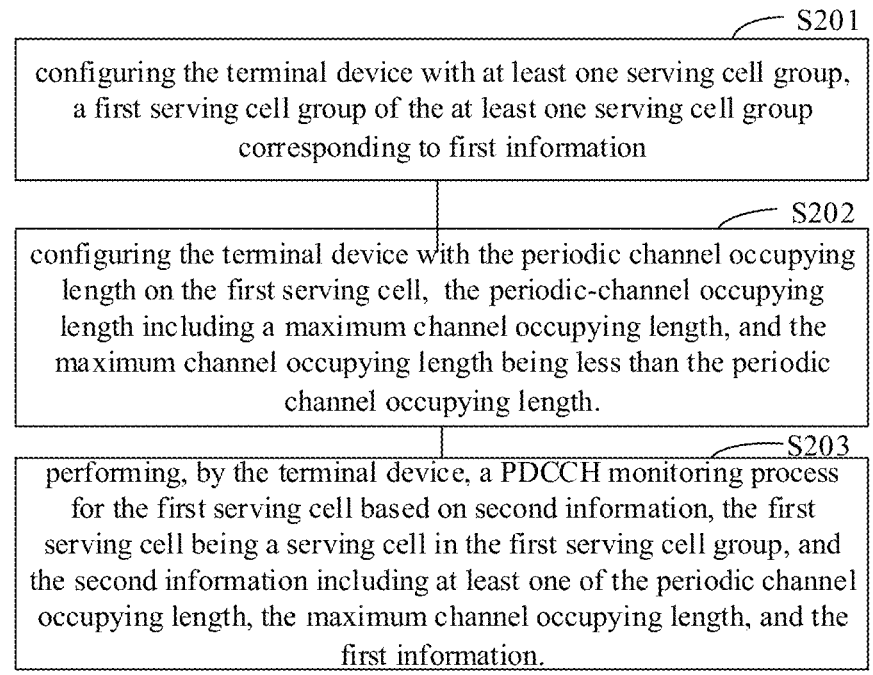
FIG. 8 is a flowchart of the physical channel monitoring method according to another embodiment of the present disclosure.

As shown in FIG. 8, a physical channel monitoring method is provided in the embodiments of the present disclosure. The method may include the following operations.

At block S201, configuring the terminal device with at least one serving cell group, a first serving cell group of the at least one serving cell group corresponding to first information.

At block S202, configuring the terminal device with the periodic channel occupying length on the first serving cell, the periodic-channel occupying length including a maximum channel occupying length, and the maximum channel occupying length being less than the periodic channel occupying length.

At block S203, performing, by the terminal device, a PDCCH monitoring process for the first serving cell based on second information, the first serving cell being a serving cell in the first serving cell group, and the second information including at least one of the periodic channel occupying length, the maximum channel occupying length, and the first information.

In some embodiments, the physical channel may include the controlling channel. Specifically, the controlling channel may include the PDCCH.

In some embodiments, the physical channel may include the physical channel transmitted between the terminal device and another terminal device. For example, the physical channel may include the controlling channel transmitted between the terminal device and another terminal device. Or, the physical channel may include the physical channel transmitted between the network device and another network device. For example, the physical channel may include the controlling channel transmitted between the network device and another network device.

The terminal device in the FBE scenario (or, in other words, the semi-static channel-accessing mode) is considered in the embodiments of the present disclosure. In response to configuring the terminal device with the at least one serving cell group, the first serving cell group of the at least one serving cell group corresponding to the first information, and configuring the terminal device with the periodic channel occupying length on the first serving cell of the first serving cell group, the terminal device may perform the PDCCH monitoring process for the first serving cell based on the second information. The second information may include the periodic channel occupying length, or also include the maximum channel occupying length in the periodic channel occupying length, or include the first information corresponding to the first serving cell. In this way, the switching behaviors of the terminal device for the SS groups of each serving cell of the first serving cell group may be determined.

For each serving cell of the serving cell group, a FBE parameter such as the periodic channel occupying length is configured independently to each cell. In the present embodiment, the periodic channel occupying length configured for each serving cell of the first serving cell group is the same. In the embodiments of the present disclosure, the first serving cell group corresponds to the first information. In some embodiments, the first serving cell of the first serving cell group corresponds to the first information.

In some embodiments, the first information may be the SS switching indicating information. For example, the first information may be the SS switching indicating information of the first serving cell group. Or, in other words, the first information may be the SS switching indicating information configured by the network device for the first serving cell group.

According to the embodiments of the present disclosure, when performing the PDCCH monitoring process on the first serving cell of the first serving cell group, the terminal device may switch the SS group according to at least one of various embodiments in the following.

Manner One

In the embodiments of the present disclosure, in a case where the terminal device receives the first DCI format and the first information in the first DCI format indicates the first group ID, or the first DCI format is received on at least one serving cell of the first serving cell group and the first information (e.g., the switching indicating signaling of the first cell group) in the first DCI format indicates the first group ID, when the terminal device does not perform the PDCCH monitoring process based on the SSS corresponding to the first group ID, the terminal device may perform the PDCCH monitoring process based on the SSS corresponding to the first group ID from the slot 1 of the first serving cell, and stop the PDCCH monitoring processes based on the SSSs corresponding to the other group IDs. In some embodiments, the first DCI format may include the DCI format 2_0.

In some embodiments, the other group IDs in this case may include the second group ID.

In some embodiments, the slot 1 may include the first slot after the at least p symbols to the last symbol of the PDCCH carrying the first DCI format.

Manner Two

In the embodiments of the present disclosure, in a case where the terminal device receives the first DCI format and the first information in the first DCI format indicates the second group ID, or the first DCI format is received on at least one serving cell of the first serving cell group and the first information in the first DCI format indicates the second group ID, when the terminal device does not perform the PDCCH monitoring process based on the SSS corresponding to the second group ID, the terminal device may perform the PDCCH monitoring process based on the SSS corresponding to the second group ID from the slot 2 of the first serving cell, and stop the PDCCH monitoring processes based on the SSSs corresponding to the other group IDs.

In some embodiments, the other group IDs in this case may include the first group ID.

In some embodiments, the slot 2 may include the first slot after the at least p symbols to the last symbol of the PDCCH carrying the first DCI format.

Manner Three

In the embodiments of the present disclosure, in the case where the terminal device receives the first DCI format and the first information in the first DCI format indicates the second group ID, or the first DCI format is received on at least one serving cell of the first serving cell group and the first information in the first DCI format indicates the second group ID, the terminal may set the first timer to the first timing value.

In some embodiments, in response to receiving the first DCI format and the first information in the first DCI format indicating the second group ID, the terminal may set the first timer to the first timing value at the slot where the terminal device detects the first DCI format.

In some embodiments, the first timing value of the first timer may be configured by the high layer. For example, the first timing value may be provided by the high-layer parameter searchSpaceSwitchingTimer-r16. The first timing value may be configured to include N numbers of time units such as the slots, and N is the positive integer. In some embodiments, the first timer may take the time unit such as the slot, or the symbol, or the sub-frame, or the sub-slot (for example, one sub-slot may include the certain integer numbers of symbols, and the certain integer being less than 14) as the timing unit. For example, the timing unit of the value of the first timer is the slot. After the first timer is set with the value, the value of the first timer may be subtracted by 1 each time the slot passes.

In some embodiments, each serving cell may be configured with the first timer, or each terminal device may be configured with the first timer. For example, the first timer may be the timer corresponding to the first serving cell.

In some embodiments, in response to the terminal device performing the PDCCH monitoring process based on the SSS corresponding to the second group ID, the terminal device may perform the PDCCH monitoring process based on the SSS corresponding to the first group ID from the slot 3 of the first serving cell, and stop the PDCCH monitoring process based on the SSS corresponding to the second group ID.

In some embodiments, the slot 3 may include the first slot after the at least p symbols to the slot corresponding to the first timer in expiring.

In the manners 1-3 above, the slot 1, the slot 2, the slot 3, and the P symbols may be determined based on the first subcarrier space.

In some embodiments, the first subcarrier space may be the subcarrier space corresponding to the first serving cell.

In some embodiments, the first subcarrier space may be preset or configured by the network device. For example, the network device may configure the first subcarrier space to be 15 kHz, or the configuration of the first subcarrier space to be $\mu=0$.

In some embodiments, the first subcarrier spacing is the minimum subcarrier spacing of subcarrier spacings corresponding to the serving cells in the first serving cell group. For example, when the minimum subcarrier spacing of multiple subcarrier spacings corresponding to multiple activated BWPs of multiple cells in the first serving cell group is 30 kHz, the first subcarrier spacing is 30 kHz. When a BWP switching occurs in a cell in the first serving cell group, subcarrier spacings corresponding to the cell in the first serving cell group may include the minimum subcarrier spacing before the BWP switching and the minimum subcarrier spacing after the BWP switching. In other words, the first subcarrier spacing may be determined based on the minimum subcarrier spacing before the BWP switching and the minimum subcarrier spacing after the BWP switching.

In some embodiments, the first subcarrier spacing may be the maximum subcarrier spacing of the subcarrier spacings corresponding to the serving cells in the first serving cell group. When the BWP switching occurs in a cell of the first serving cell group, the first subcarrier spacing may be determined based on the maximum subcarrier spacing before the BWP switching and the maximum subcarrier spacing after the BWP switching.

In some embodiments the first subcarrier spacing is the minimum subcarrier spacing supported on an unlicensed carrier.

In some embodiments the first subcarrier spacing is the maximum subcarrier spacing supported on the unlicensed carrier.

In some embodiments of the present disclosure, the value of the first subcarrier space and the value of P in the P symbols may satisfy at least one of the following relationships.
   a) The P is greater than or equal to 10, in response to the first subcarrier space being 15 kHz or a configuration of the first subcarrier space being $\mu=0$.
   b) The P is greater than or equal to 12, in response to the first subcarrier space being 30 kHz or the configuration of the first subcarrier space being $\mu=1$.
   c) The P is greater than or equal to 22, in response to the first subcarrier space being 60 kHz or the configuration of the first subcarrier space being $\mu=2$.
   d) The P is greater than or equal to 25, in response to the first subcarrier space being 120 kHz or the configuration of the first subcarrier space being $\mu=3$.

In some embodiments, at least one of the above cases corresponds to the UE capability 1.

In some embodiments of the present disclosure, the value of the first subcarrier space and the value of P in the P symbols may satisfy at least one of the following relationships.
   a) The P is greater than or equal to 5, in response to the first subcarrier space being 15 kHz or a configuration of the first subcarrier space being $\mu=0$.
   b) The P is greater than or equal to 5.5, in response to the first subcarrier space being 30 kHz or the configuration of the first subcarrier space being $\mu=1$.
   c) The P is greater than or equal to 11, in response to the first subcarrier space being 60 kHz or the configuration of the first subcarrier space being $\mu=2$.

In some embodiments, at least one of the above cases corresponds to the UE capability 2.

In some embodiments, the manners 1-3 above may be applied in COT in FFP, or the maximum COT in FFP.

The manners 1-3 above respectively describe the switching process for the SS group performed by the terminal device in a case where the first information indicates different group IDs and in response to the terminal performing the PDCCH monitoring process for the at least one serving cell of the first serving cell group based on the first information. In addition, the terminal may perform the PDCCH monitoring process for the at least one serving cell of the first serving cell group and switch the SS group based on the periodic channel occupying length or the maximum channel occupying length, which will be described in detail respectively in the following.

Manner Four

In the embodiments of the present disclosure, the terminal device may perform the PDCCH monitoring process based on a SSS corresponding to a default SS group ID from the initiate symbol in the first periodic channel occupying length. Or the terminal device may perform the PDCCH monitoring process based on the SSS corresponding to the default group ID from the initiate symbol of the first FFP.

In some embodiments, the default group ID may be the first group ID (e.g., the group 0) or the second group ID (e.g., the group 1). The default group ID may be preset, or configured by the network device, or may be agreed upon.

In the embodiments of the present disclosure, the first periodic channel occupying length may correspond to FFP in any frame structure, such that the terminal device may always perform the PDCCH monitoring process based on the SSS corresponding to the default SS group (e.g., the group 0) from the initiate position of each FFP. For example, when performing the PDCCH monitoring process based on the SSS corresponding to the group 1 in the FFP, the terminal device may be required to switch to perform the PDCCH monitoring process based on the SSS corresponding to the default group 0.

Manner Five

The terminal device may perform the PDCCH monitoring process for the first serving cell in the channel occupation of the first periodic channel occupying length. Or, in other words, the terminal device may perform the PDCCH monitoring process for the first serving cell in COT in the first FFP.

In the embodiments of the present disclosure, the terminal device may not perform the PDCCH monitoring process from the last symbol of the channel occupation of the first periodic channel occupying length, i.e., from the end position of the last symbol, to the initiate symbol in the second periodic channel occupying length. The first periodic channel occupying length and the second periodic channel occupying length are two consecutive periodic channel occupying lengths, and the first periodic channel occupying length is ahead of the second periodic channel occupying length in the time domain. Or, in other words, the terminal device may not perform the PDCCH monitoring process from the last symbol of the channel occupation of the first FFP, i.e., from the end position of the last symbol, to the initiate symbol in the second FFP. The first FFP and the second FFP are two consecutive periodic channel occupying lengths, and the first FFP is ahead of the second FFP in the time domain.

In some embodiments, the channel occupation of the first periodic channel occupying length may be determined based on the maximum channel occupying length.

In some embodiments, the channel occupation of the first periodic channel occupying length may be determined based on the remaining channel occupying length indicated in the first DCI format.

In some embodiments, in response to receiving the first DCI format and the first DCI format indicating the remaining channel occupying length, or receiving the first DCI format on the at least one serving cell of the first serving cell group and the first DCI format indicating the remaining channel occupying length, the channel occupation of the first periodic channel occupying length may be determined based on the remaining channel occupying length indicated in the first DCI format. In response to not receiving the first DCI format or the first DCI format not indicating the remaining channel occupying length, the channel occupation of the first periodic channel occupying length may be determined based on the maximum channel occupying length.

In some embodiments, when the first DCI format includes the SFI information or the indication information of the COT length, the first DCI format may indicate the remaining channel occupying length. When the first DCI format does not include the SFI information or the indication information of the COT length, the first DCI format does not indicate the remaining channel occupying length.

In response to configuring the terminal device to monitor the first DCI format corresponding to at least one cell in the first serving cell group and receiving information of at least one remaining channel occupying length of the at least one cell indicated by the first DCI format by the terminal device, the terminal device may determine the last symbol of the channel occupation of the first periodic channel occupying length based on a last symbol of a first remaining channel occupying length in the at least one remaining channel occupying length.

In some embodiments, the first remaining channel occupying length is a remaining channel occupying length which is ended latest in the at least one remaining channel occupying length, or a remaining channel occupying length which is ended earliest in the at least one remaining channel occupying length.

In some embodiments of the present disclosure, in response to the first serving cell including the first SSS which may include at least one SSS, and the first SSS not belonging to neither the SSS corresponding to the first group ID nor the SSS corresponding to the second group ID, the terminal device may perform the PDCCH monitoring process base on the first SSS. Or, the terminal device may perform the PDCCH monitoring process base on the first SSS in the channel occupation of the first periodic channel occupying length.

In some embodiments of the present disclosure, in response to the first serving cell including the second SSS which may include at least one SSS, and the first SSS belonging to both the SSS corresponding to the first group ID and the SSS corresponding to the second group ID, the terminal device may perform the PDCCH monitoring process base on the second SSS. Or, the terminal device may perform the PDCCH monitoring process base on the second SSS in the channel occupation of the first periodic channel occupying length.

In some embodiments, in response to the first serving cell including the SSS corresponding to the first group ID but not including the SSS corresponding to the second group ID, the terminal device may perform the PDCCH monitoring process base on the SSS corresponding to the first group ID. Or, the terminal device may perform the PDCCH monitoring process base on the SSS corresponding to the first group ID in the channel occupation of the first periodic channel occupying length.

The switching behaviors of the terminal device for the SS groups of at least one serving cell in the serving cell group in the FBE scenario on may be determined according to at least one embodiments of the present disclosure described above.

Figure 9:
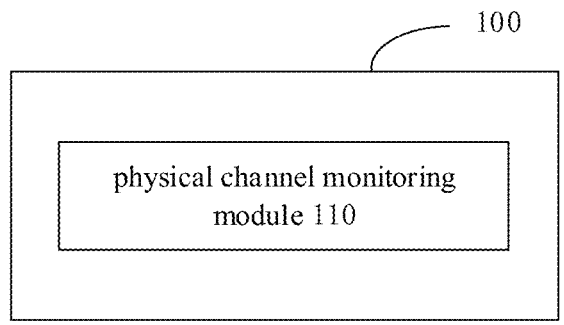
FIGS. 9 and 10 are schematic structural views of the terminal device according to some embodiments of the present disclosure.

Specific settings and implementation manners of the embodiments of the present application are described above through multiple embodiments from different perspectives. Corresponding to a processing method according to at least one embodiment above, a terminal device 100 is provided in the embodiments of the present disclosure as shown in FIG. 9, and includes the following.

A physical channel monitoring module 110, configured to perform the PDCCH monitoring process for the first serving cell based on the second information in response to configuring the terminal device with the periodic channel occupying length on the first serving cell and the first serving cell corresponding to the first information.

The periodic channel occupying length may include the maximum channel occupying length, and the maximum channel occupying length is less than the periodic channel occupying length, and the second information may include at least one of the periodic channel occupying length, the maximum channel occupying length, and the first information.

In some embodiments, the physical channel monitoring module may include a receiving module and/or processing module. The receiving module is configured to receive a candidate PDCCH, and the processing module is configured to detect whether the candidate PDCCH include a DCI format.

In some embodiments, the performing, by the terminal device, the PDCCH monitoring process based on a SSS may include performing a PDCCH blind detecting process based on the candidate PDCCH in the SSS, and determining whether the candidate PDCCH includes DCI information according to a result of the PDCCH blind detecting process. When detecting the DCI format on a certain candidate PDCCH during the PDCCH monitoring process, the terminal device may consider that the candidate PDCCH includes the DCI information. When the terminal device does not detect the DCI format on a certain candidate PDCCH during the PDCCH monitoring process, the terminal device may consider that the candidate PDCCH does not include the DCI information.

In some embodiments, the physical channel monitoring module 110 may include a first monitoring submodule. The first monitoring submodule is configured to perform the PDCCH monitoring process based on the SSS corresponding to the first group ID from the first slot on the first serving cell and stop the PDCCH monitoring process based on the SSSS corresponding to the other group IDs, in response to receiving the first DCI format, the first information in the first DCI format indicating the first group ID, and the terminal device not performing the PDCCH monitoring process based on the SSS corresponding to the first group ID.

In some embodiments, the physical channel monitoring module 110 may include a second monitoring submodule. The second monitoring submodule is configured to perform the PDCCH monitoring process based on the SSS corresponding to the second group ID from the second slot on the first serving cell and stop the PDCCH monitoring process based on the SSSs corresponding to the other group IDs, in response to receiving the first DCI format, the first information in the first DCI format indicating the second group ID, and the terminal device not performing the PDCCH monitoring process based on the SSS corresponding to the second group ID.

In some embodiments, the physical channel monitoring module 110 may include a third monitoring submodule. The third monitoring submodule is configured to perform the PDCCH monitoring process based on the SSS corresponding to the first group ID from the third slot on the first serving cell and stop the PDCCH monitoring process based on the SSS corresponding to the second group ID, in response to the terminal device performing the PDCCH monitoring process based on the SSS corresponding to the second group ID.

In some embodiments, the physical channel monitoring module 110 may include a fourth monitoring submodule. The fourth monitoring submodule is configured to perform the PDCCH monitoring process base on the first SSS, in response to the first serving cell including the first SSS which does not belong to the SSS corresponding to the first group ID or the SSS corresponding to the second group ID.

In some embodiments, the physical channel monitoring module 110 may include a fifth monitoring submodule. The fifth monitoring submodule is configured to perform the PDCCH monitoring process based on the SSS corresponding to the default group ID from the initiate symbol in the first periodic channel occupying length.

In some embodiments, the physical channel monitoring module 110 may include a sixth monitoring submodule. The sixth monitoring submodule is configured to perform the PDCCH monitoring process for the first serving cell in the channel occupation of the first periodic channel occupying length.

In some embodiments, the physical channel monitoring module 110 may include a seventh monitoring submodule. The seventh monitoring submodule is configured not to perform the PDCCH monitoring process from the last symbol of the channel occupation of the first periodic channel occupying length to the initiate symbol in the second periodic channel occupying length. The first periodic channel occupying length and the second periodic channel occupying length are two consecutive periodic channel occupying lengths, and the first periodic channel occupying length is ahead of the second periodic channel occupying length in the time domain.

Figure 10:
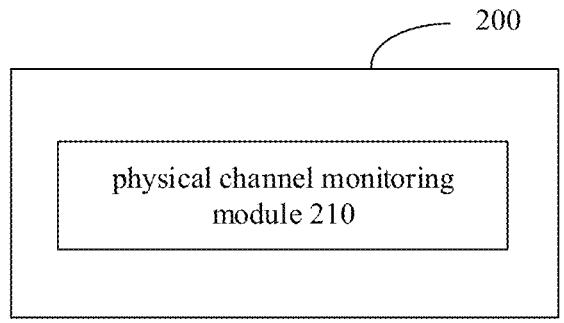

Corresponding to the processing method according to at least one embodiment above, another terminal device 200 is provided in the embodiments of the present disclosure, as shown in FIG. 10. The terminal device 200 may include the following.

A physical channel monitoring module 210, configured to perform the PDCCH monitoring process for the first serving cell based on the second information in response to configuring the terminal device with at least one serving cell group, the first serving cell group in the at least one serving cell group corresponding to the first information, and configuring the terminal device with the periodic channel occupying length on the first serving cell of the first serving cell group.

In some embodiments, the second information may include at least one of the periodic channel occupying length, the maximum channel occupying length, and the first information.

The terminal device 100 and the terminal device 200 in the embodiments of the present disclosure may implement corresponding functions described in the foregoing method embodiments. Functions, implementing manners, and beneficial effects corresponding to each module (a submodule, a unit, or a component, etc.) of the terminal device 100 and the terminal device 200 may refer to corresponding descriptions in the foregoing method embodiments, which will not be repeated herein.

It should be noted that described functions of each module (the submodule, the unit, or the component, etc.) in the terminal device 100 and the terminal device 200 according to the embodiments of present disclosure may be implemented by different modules (submodules, units, or components, etc.), or by the same module (the sub-module, the unit, or the component, etc.). For example, the first monitoring submodule and the second monitoring submodule may be different modules or the same module, both of which may realize the corresponding functions of the terminal device according to the embodiments of the present disclosure.

Figure 11:
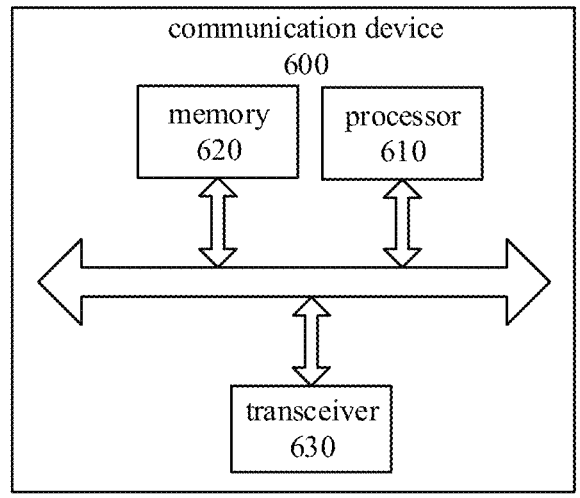
FIG. 11 is a schematic view of a communication device according to some embodiments of the present disclosure.

FIG. 11 is a structural schematic view of a communication device 600 according to some embodiments of the present disclosure. The communication device 600 may include a processor 610. The processor 610 may be configured to call a computer program from a memory and run the computer program to implement the method according to the embodiments of the present disclosure.

In some embodiments, the communication device 600 may further include the memory 620. The processor 610 may be configured to call the computer program from the memory 620 and run the computer program to implement the method according to the embodiments of the present disclosure.

In some embodiments, the memory 620 may be a separate device independent of the processor 610, or may be integrated in the processor 610.

In some embodiments, the communication device 600 may further include a transceiver 630. The processor 610 may be configured to control the transceiver 630 to communicate with other devices. Specifically, the processor 610 may be configured to control the transceiver 1030 to send information or data to other devices, or receive information or data sent by the other devices.

In some embodiments, the transceiver 630 may include a transmitter and a receiver. The transceiver 630 may further include antennas, and the number of the antennas may be one or more.

In some embodiments, the communication device 600 may be the network device in the embodiments of the present disclosure and may implement a corresponding process implemented by the network device in each method in the embodiments of the present disclosure, which is not repeated herein for concision.

In some embodiments, the communication device 600 may be the terminal device in the embodiments of the present disclosure and may implement a corresponding process implemented by the terminal device in each method of the embodiments of the present disclosure, which is not repeated herein for concision.

Figure 12:
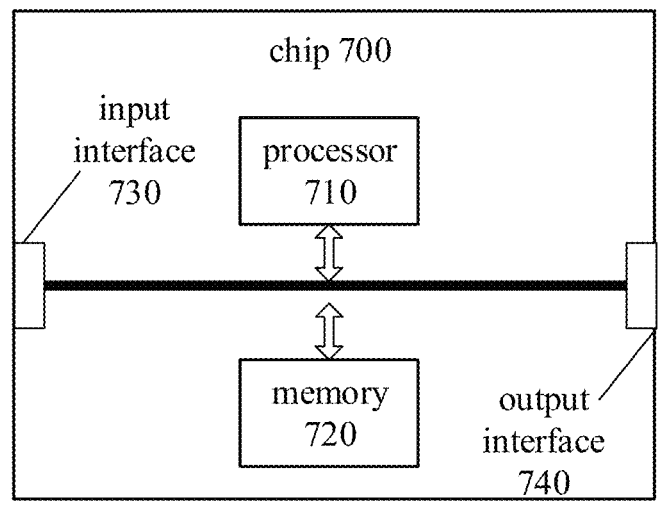
FIG. 12 is a schematic view of a chip according to some embodiments of the present disclosure.

FIG. 12 is a structural schematic view of a chip 700 according to some embodiments of the present disclosure. The chip 7100 may include a processor 710. The processor 710 may call a computer program from a memory and run the computer program to implement the method in the embodiments of the present disclosure.

In some embodiments, the chip 700 may further include the memory 720. The processor 710 may call the computer program from the memory 1120 and un the computer program to implement the method in the embodiments of the present disclosure.

The memory 720 may be a separate device independent of the processor 710, or may be integrated in the processor 710.

In some embodiments, the chip 700 may further include an input interface 730. The processor 710 may control the input interface 730 to communicate with other devices or chips. Specifically, the processor 710 may control the input interface 730 to acquire information or data sent by other devices or chips.

In some embodiments, the chip 700 may further include an output interface 740. The processor 710 may be configured to control the output interface 740 to communicate with the other devices or chips. Specifically, the processor 710 may be configured to control the output interface 740 to output information or data to the other devices or chips.

In some embodiments, the chip may be applied to the network device in the embodiments of the present disclosure, and implement the corresponding process implemented by the network device in each method of the embodiments of the present disclosure, which is not repeated herein for concision.

In some embodiments, the chip may be applied to the terminal device in the embodiments of the present disclosure, and implement the corresponding process implemented by the terminal device in each method of the embodiments of the present disclosure, which is not repeated herein for concision.

It should be understood that the chip described in the embodiments of the present disclosure may also be referred to as a system-on-chip, a system chip, a chip system, or system-on-chip chip, or the like.

The processor described above may be a general-purpose processor, a digital signal processor (DSP), a field programmable gate array (FPGA), an application specific integrated circuit (ASIC) or other programmable logic devices, a transistor logic device, a discrete hardware component, etc. The general-purpose processor described above may be a microprocessor or any conventional processor, or the like.

The memory described above may be either a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically EPROM (EEPROM), or a flash memory. The volatile memory may be a random access memory (RAM).

It should be understood that above memories are exemplary but not limitative descriptions. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ES-DRAM), a synch link DRAM (SLDRAM), and a Direct Rambus RAM (DR RAM), and so on. That is, the memory in the embodiments of the present disclosure may be intended to include but not limited to these and any other suitable types of memories.

Figure 13:
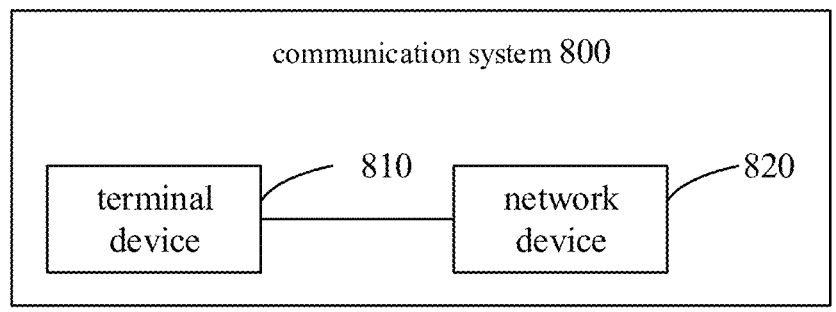
FIG. 13 is a schematic view of the communication system according to some embodiments of the present disclosure.

FIG. 13 is a schematic view of the communication system 800 according to some embodiments of the present disclosure. The communication system 800 may include a terminal device 810 and a network device 820.

The terminal device 810 may be configured to implement the corresponding functions implemented by the terminal device in the method of each embodiment of the present disclosure, and the network device 820 may be configured to implement the corresponding functions implemented by the network device in the method of each embodiment of the present disclosure. A repeated description will not be made herein for concision.

In the above embodiments, it may be implemented in whole or in part by a software, a hardware, a firmware, or any combination thereof. When implemented by the software, it may be implemented in whole or in part in a form of a computer program product. The computer program product may include one or more computer instructions. When the computer program instructions are loaded and executed on a computer, all or part of the processes or functions described in the embodiments of the present disclosure may be generated. The computer may be a general purpose computer, a special purpose computer, a computer network, or other programmable devices. The computer instructions may be stored in a computer readable storage medium, or be transmitted from the computer readable storage medium to another computer readable storage medium. For example, the computer instructions may be transmitted from a website site, a computer, a server, or a data center by wire (e.g., a coaxial cable, an optical fiber, a Digital User Line (DSL)) or wireless (e.g., infrared, wireless, microwave, etc.) to another website site, another computer, another server, or another data center. The computer-readable storage medium may be any available medium that may be accessed by the computer, or a data storage device such as a server, a data center, etc. including one or more available media integrated. The available media may be magnetic media (e.g., floppy disks, hard disks, magnetic tapes), optical media (e.g., DVD), or semiconductor media (e.g., Solid State Disk (SSD)), and the like.

It should be understood that, in various embodiments of the present disclosure, a size of a sequence numbers of the above process does not mean an executing sequence. The executing sequence of each process should be determined based on its function and internal logic, and should be not understood as any limitation to an implementation process in the embodiments of the present disclosure. implementation constitutes any limitation. Those skilled in the art may clearly understand that, for the convenience and brevity of description, a specific operating process of the above system, device, and unit may refer to a corresponding process in the above method embodiments, which will not be repeated herein.

A protection scope of the present disclosure is not limited to the above descriptions which are only specific embodiments of the present disclosure. Any change or substitution easily obtained by a person skilled in the art who is familiar with the present technical field should be covered within the protection scope of the present disclosure. Therefore, the protection scope of the present disclosure shall be subject to a protection scope of the claims.

What is claimed is:

1. A physical channel monitoring method, applied to a terminal device, comprising:
configuring the terminal device with at least one serving cell group; wherein a first serving cell group of the at least one serving cell group corresponds to first information;
configuring the terminal device with a periodic channel occupying length on a first serving cell, wherein the periodic channel occupying length comprises a maximum channel occupying length, and the maximum channel occupying length is less than the periodic channel occupying length; and
performing, by the terminal device, a physical downlink control channel (PDCCH) monitoring process for the first serving cell based on second information, wherein the first serving cell is a serving cell in the first serving cell group, and the second information comprises at least one of the periodic channel occupying length, the maximum channel occupying length, and the first information;
wherein the periodic channel occupying length is a length of a fixed frame period (FFP), and the maximum channel occupying length is a length of a maximum channel occupation time (COT) corresponding to the FFP;
wherein performing, by the terminal device, the PDCCH monitoring process for the first serving cell based on second information, comprises:
in response to receiving a first downlink control information (DCI) format and the first information in the first DCI format indicating a second group ID, setting, by the terminal, a first timer to a first timing value;

wherein performing, by the terminal device, the PDCCH monitoring process for the first serving cell based on second information, comprises:

in response to the terminal device performing the PDCCH monitoring process based on a SSS corresponding to the second group ID, performing, by the terminal device, the PDCCH monitoring process based on a SSS corresponding to a first group ID from a slot 3 on the first serving cell, and stopping the PDCCH monitoring process based on a SSS corresponding to the second group ID.

2. The method according to claim 1, wherein performing, by the terminal device, the PDCCH monitoring process for the first serving cell based on second information, comprises:

in response to receiving a first DCI format and the first information in the first DCI format indicating a first group ID, when the terminal device does not perform the PDCCH monitoring process based on a search space sets (SSS) corresponding to the first group ID, the terminal device performing the PDCCH monitoring process based on the SSS corresponding to the first group ID from a slot 1 of the first serving cell and stopping PDCCH monitoring processes based on SSSs corresponding to other group IDs.

3. The method according to claim 2, wherein the slot 1 comprises a first slot after at least p symbols of a last symbol of a PDCCH carrying the first DCI format.

4. The method according to claim 3, wherein the P symbols are determined based on a first subcarrier space.

5. The method according to claim 4, wherein one of the following:

the first subcarrier space is a subcarrier space corresponding to the first serving cell;
the first subcarrier space is preset;
the first subcarrier space is configured by a network device;
the first subcarrier space is a minimum subcarrier spacing in subcarrier spaces corresponding to serving cells in the first serving cell group; and
the first subcarrier space is a maximum subcarrier space in the subcarrier spaces corresponding to the serving cells in the first serving cell group.

6. The method according to claim 4, wherein one of the following:

the P is greater than or equal to 10, in response to the first subcarrier space being 15 kHz or a configuration of the first subcarrier space being $\mu=0$;
the P is greater than or equal to 12, in response to the first subcarrier space being 30 kHz or the configuration of the first subcarrier space being $\mu=1$;
the P is greater than or equal to 22, in response to the first subcarrier space being 60 kHz or the configuration of the first subcarrier space being $\mu=2$; and
the P is greater than or equal to 25, in response to the first subcarrier space being 120 kHz or the configuration of the first subcarrier space being $\mu=3$.

7. The method according to claim 4, wherein one of the following:

the P is greater than or equal to 5, in response to the first subcarrier space being 15 kHz or a configuration of the first subcarrier space being $\mu=0$;
the P is greater than or equal to 5.5, in response to the first subcarrier space being 30 kHz or the configuration of the first subcarrier space being $\mu=1$; and
the P is greater than or equal to 11, in response to the first subcarrier space being 60 kHz or the configuration of the first subcarrier space being $\mu=2$.

8. The method according to claim 1, wherein performing, by the terminal device, the PDCCH monitoring process for the first serving cell based on second information, comprises:

in response to receiving a first DCI format and the first information in the first DCI format indicating a second group ID, when the terminal device does not perform the PDCCH monitoring process based on a SSS corresponding to the second group ID, the terminal device performing the PDCCH monitoring process based on the SSS corresponding to the second group ID from a slot 2 on the first serving cell and stopping PDCCH monitoring processes based on SSSs corresponding to other group IDs.

9. The method according to claim 8, wherein the slot 2 comprises a first slot after at least p symbols of a last symbol of a PDCCH carrying the first DCI format.

10. The method according to claim 1, wherein the slot 3 comprises a first slot after at least p symbols after a slot corresponding to the first timer in expiring.

11. The method according to claim 1, wherein performing, by the terminal device, the PDCCH monitoring process for the first serving cell based on second information, comprises:

in response to the first serving cell comprising a first SSS which does not belong to a SSS corresponding to a first group ID or a SSS corresponding to a second group ID, performing, by the terminal device, the PDCCH monitoring process base on the first SSS.

12. The method according to claim 1, wherein performing, by the terminal device, the PDCCH monitoring process for the first serving cell based on second information, comprises:

performing, by the terminal device, the PDCCH monitoring process based on a SSS corresponding to a default search space (SS) group ID from an initiate symbol in a first periodic channel occupying length.

13. The method according to claim 12, wherein:

the default group ID is a first group ID or a second group ID; and/or,
the default group ID is preset or configured by a network device.

14. The method according to claim 1, wherein performing, by the terminal device, the PDCCH monitoring process for the first serving cell based on second information, comprises:

performing, by the terminal device, the PDCCH monitoring process for the first serving cell in a channel occupation of a first periodic channel occupying length.

15. The method according to claim 14, wherein the channel occupation of the first periodic channel occupying length is determined based on the maximum channel occupying length; or wherein the channel occupation of the first periodic channel occupying length is determined based on a remaining channel occupying length indicated in a first DCI format.

16. The method according to claim 15, wherein in response to receiving the first DCI format and the first DCI format indicating the remaining channel occupying length, the channel occupation of the first periodic channel occupying length is determined based on the remaining channel occupying length indicated in the first DCI format; and in response to not receiving the first DCI format or the first DCI format not indicating the remaining channel occupying length, the channel occupation of the first periodic channel occupying length is determined based on the maximum channel occupying length.

17. The method according to claim 15, wherein in response to the first DCI format comprising SFI information or indication information of a channel occupying time length, the first DCI format indicates the remaining channel occupying length; and
in response to the first DCI format not comprising the SFI information or the indication information of the channel occupying time length, the first DCI format does not indicate the remaining channel occupying length.

18. The method according to claim 15, wherein in response to configuring the terminal device to monitor a first DCI format corresponding to at least one cell in the first serving cell group and receiving information of at least one remaining channel occupying length of the at least one cell indicated by the first DCI format by the terminal device, determining, by the terminal device, a last symbol of the channel occupation of the first periodic channel occupying length based on a last symbol of a first remaining channel occupying length in the at least one remaining channel occupying length.

19. The method according to claim 18, wherein the first remaining channel occupying length is a remaining channel occupying length which is ended latest in the at least one remaining channel occupying length, or a remaining channel occupying length which is ended earliest in the at least one remaining channel occupying length.

20. The method according to claim 1, wherein performing, by the terminal device, the PDCCH monitoring process for the first serving cell based on second information, comprises:
not performing, by the terminal device, the PDCCH monitoring process from a last symbol of a channel occupation of a first periodic channel occupying length to an initiate symbol in a second periodic channel occupying length, wherein the first periodic channel occupying length and the second periodic channel occupying length are two consecutive periodic channel occupying lengths, and the first periodic channel occupying length is ahead of the second periodic channel occupying length in a time domain.

21. A terminal device, comprising:
a processor; and
a memory configured to store a computer program;
wherein when the computer program is executed by the processor, the processor is caused to implement the following:
configuring the terminal device with at least one serving cell group; wherein a first serving cell group of the at least one serving cell group corresponds to first information;
configuring the terminal device with a periodic channel occupying length on a first serving cell, wherein the periodic channel occupying length comprises a maximum channel occupying length, and the maximum channel occupying length is less than the periodic channel occupying length; and
performing, by the terminal device, a PDCCH monitoring process for the first serving cell based on second information, wherein the first serving cell is a serving cell in the first serving cell group, and the second information comprises at least one of the periodic channel occupying length, the maximum channel occupying length, and the first information;
wherein the periodic channel occupying length is a length of a fixed frame period (FFP), and the maximum channel occupying length is a length of a maximum channel occupation time (COT) corresponding to the FFP;
wherein performing, by the terminal device, the PDCCH monitoring process for the first serving cell based on second information, comprises:
in response to receiving a first DCI format and the first information in the first DCI format indicating a second group ID, setting, by the terminal, a first timer to a first timing value;
wherein performing, by the terminal device, the PDCCH monitoring process for the first serving cell based on second information, comprises:
in response to the terminal device performing the PDCCH monitoring process based on a SSS corresponding to the second group ID, performing, by the terminal device, the PDCCH monitoring process based on a SSS corresponding to a first group ID from a slot 3 on the first serving cell, and stopping the PDCCH monitoring process based on a SSS corresponding to the second group ID.

22. The terminal device according to claim 21, wherein in response to receiving a first DCI format and the first information in the first DCI format indicating a first group ID, when the terminal device does not perform the PDCCH monitoring process based on a SSS corresponding to the first group ID, the processor is configured to cause the terminal device performing the PDCCH monitoring process based on the SSS corresponding to the first group ID from a slot 1 of the first serving cell and stopping PDCCH monitoring processes based on SSSs corresponding to other group IDs.

23. The terminal device according to claim 21, wherein in response to receiving a first DCI format and the first information in the first DCI format indicating a second group ID, when the terminal device does not perform the PDCCH monitoring process based on a SSS corresponding to the second group ID, the processor is configured to cause the terminal device performing the PDCCH monitoring process based on the SSS corresponding to the second group ID from a slot 2 on the first serving cell and stopping PDCCH monitoring processes based on SSSs corresponding to other group IDs.

24. The terminal device according to claim 21, wherein in response to receiving a first DCI format and the first information in the first DCI format indicating a second group ID, the processor is configured to cause the terminal setting a first timer to a first timing value.

25. The terminal device according to claim 21, wherein in response to the first serving cell comprising a first SSS which does not belong to a SSS corresponding to a first group ID or a SSS corresponding to a second group ID, the processor is configured to cause the terminal device performing the PDCCH monitoring process base on the first SSS.

26. The terminal device according to claim 21, wherein the processor is configured to cause the terminal device performing the PDCCH monitoring process based on a SSS corresponding to a default group ID from an initiate symbol in a first periodic channel occupying length.

27. The terminal device according to claim 21, wherein the processor is configured to cause the terminal device not performing the PDCCH monitoring process from a last symbol of a channel occupation of a first periodic channel occupying length to an initiate symbol in a second periodic channel occupying length, wherein the first periodic channel occupying length and the second periodic channel occupying length are two consecutive periodic channel occupying lengths, and the first periodic channel occupying length is ahead of the second periodic channel occupying length in a time domain.

28. A non-transitory computer-readable storage medium configured to store a computer program, which when executed by a causes, causes the computer to:
- configure a terminal device with at least one serving cell group, wherein a first serving cell group of the at least one serving cell group corresponds to first information;
- configure the terminal device with a periodic channel occupying length on a first serving cell, wherein the periodic channel occupying length comprises a maximum channel occupying length, and the maximum channel occupying length is less than the periodic channel occupying length; and
- perform, by the terminal device, a PDCCH monitoring process for the first serving cell based on second information, wherein the first serving cell is a serving cell in the first serving cell group, and the second information comprises at least one of the periodic channel occupying length, the maximum channel occupying length, and the first information;

wherein the periodic channel occupying length is a length of a fixed frame period (FFP), and the maximum channel occupying length is a length of a maximum channel occupation time (COT) corresponding to the FFP;

wherein performing, by the terminal device, the PDCCH monitoring process for the first serving cell based on second information, comprises:
in response to receiving a first DCI format and the first information in the first DCI format indicating a second group ID, setting, by the terminal, a first timer to a first timing value;

wherein performing, by the terminal device, the PDCCH monitoring process for the first serving cell based on second information, comprises:
in response to the terminal device performing the PDCCH monitoring process based on a SSS corresponding to the second group ID, performing, by the terminal device, the PDCCH monitoring process based on a SSS corresponding to a first group ID from a slot 3 on the first serving cell, and stopping the PDCCH monitoring process based on a SSS corresponding to the second group ID.

* * * * *